(12) United States Patent
Yuk et al.

(10) Patent No.: US 10,730,346 B2
(45) Date of Patent: Aug. 4, 2020

(54) CASTER APPARATUS AND TRANSFERRING APPARATUS INCLUDING THE SAME

(71) Applicant: Samsung Electronics Co., Ltd., Suwon-si, Gyeonggi-do (KR)

(72) Inventors: Nam Su Yuk, Suwon-si (KR); Jung Jun Park, Hwaseong-si (KR); Eun Kyung Hong, Seoul (KR); Beom Soo Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 653 days.

(21) Appl. No.: 15/354,439

(22) Filed: Nov. 17, 2016

(65) Prior Publication Data
US 2017/0259618 A1 Sep. 14, 2017

(30) Foreign Application Priority Data
Mar. 10, 2016 (KR) .......................... 10-2016-0028720

(51) Int. Cl.
*B60B 19/14* (2006.01)
*B60B 33/06* (2006.01)
(Continued)

(52) U.S. Cl.
CPC .......... *B60B 33/063* (2013.01); *B60B 19/003* (2013.01); *B60B 19/12* (2013.01);
(Continued)

(58) Field of Classification Search
CPC ..... B60B 33/063; B60B 19/003; B60B 19/14; B60B 19/12; B60B 33/0073; B60B 33/08; B60B 2900/551
(Continued)

(56) References Cited

U.S. PATENT DOCUMENTS 5,487,437 A * 1/1996 Avitan .................. B62D 11/04
180/6.28
5,535,843 A * 7/1996 Takeda ..................... B25J 5/007
180/200
(Continued)

FOREIGN PATENT DOCUMENTS

KR 100575076 B1 5/2006
KR 10-1060164 * 8/2011
(Continued)

*Primary Examiner* — Anne Marie M Boehler
(74) *Attorney, Agent, or Firm* — Harness, Dickey & Pierce, P.L.C.

(57) ABSTRACT

A caster apparatus is provided. In one embodiment, there is provided a caster apparatus including a caster wheel and a first driving wheel disposed on a first side of the caster wheel. The first driving wheel is configured to be driven by a first motor. A second driving wheel is disposed on a second side opposite to the first side of the caster wheel. The second driving wheel is configured to be driven by a second motor different from the first motor. A first actuator is configured to move the first driving wheel in a vertical direction to a ground according to a curvature of the ground. A second actuator is configured to move the second driving wheel in a vertical direction to the ground according to a curvature of the ground, wherein the first and second driving wheels are configured to steer the caster wheel.

19 Claims, 14 Drawing Sheets

(51) Int. Cl.
*B60K 17/30* (2006.01)
*B60B 33/04* (2006.01)
*B60B 19/00* (2006.01)
*B60B 19/12* (2006.01)
*B60B 33/00* (2006.01)
*B60B 33/08* (2006.01)
*B60K 7/00* (2006.01)
*B62D 5/04* (2006.01)

(52) U.S. Cl.
CPC .......... *B60B 19/14* (2013.01); *B60B 33/0073* (2013.01); *B60B 33/04* (2013.01); *B60B 33/08* (2013.01); *B60K 7/0007* (2013.01); *B60K 17/30* (2013.01); *B62D 5/0418* (2013.01); *B60B 33/0036* (2013.01); *B60B 33/0049* (2013.01); *B60B 33/0057* (2013.01); *B60B 33/0068* (2013.01); *B60B 2900/551* (2013.01); *B60B 2900/721* (2013.01); *B60K 2007/0038* (2013.01); *B60K 2007/0092* (2013.01); *B60Y 2200/62* (2013.01)

(58) Field of Classification Search
USPC ...................... 180/6.48, 6.5, 6.54, 6.62, 6.64
See application file for complete search history.

(56) References Cited

U.S. PATENT DOCUMENTS

| | | | |
|---|---|---|---|
| 7,017,228 | B2 | 3/2006 | Silverstein et al. |
| 8,028,775 | B2 | 10/2011 | Orenbuch |
| 8,151,912 | B2* | 4/2012 | Koide ................ G05D 1/0891 180/218 |
| 8,459,383 | B1* | 6/2013 | Burget ................ B60B 19/003 180/7.1 |
| 8,910,951 | B2 | 12/2014 | Otterson et al. |
| 8,944,446 | B1* | 2/2015 | Cottingham .......... B60B 19/003 180/252 |
| 9,796,213 | B1* | 10/2017 | Menard .................. B60B 33/08 |
| 9,975,215 | B2* | 5/2018 | Mollone ................ B24B 41/02 |
| 2010/0243342 | A1* | 9/2010 | Wu ........................ B60B 19/14 180/7.1 |
| 2010/0251514 | A1 | 10/2010 | Goldberg et al. |
| 2011/0023268 | A1 | 2/2011 | Smith |
| 2015/0174957 | A1 | 6/2015 | Brazier et al. |
| 2016/0339742 | A1* | 11/2016 | Libakken ............ B60B 33/0063 |
| 2017/0267025 | A1* | 9/2017 | Yu ........................ B60B 33/0028 |
| 2017/0341465 | A1* | 11/2017 | Zdrahal ................ B60B 19/003 |
| 2018/0022197 | A1* | 1/2018 | Bewley ................ B60K 7/0007 180/21 |
| 2018/0319216 | A1* | 11/2018 | Cherian .................. B60B 33/08 |

FOREIGN PATENT DOCUMENTS

| | | |
|---|---|---|
| KR | 101204147 B1 | 11/2012 |
| KR | 101311295 B1 | 9/2013 |

\* cited by examiner

CASTER APPARATUS AND TRANSFERRING APPARATUS INCLUDING THE SAME

CROSS-REFERENCE TO RELATED APPLICATION

This application claims priority from Korean Patent Application No. 10-2016-0028720 filed on Mar. 10, 2016 in the Korean Intellectual Property Office, and all the benefits accruing therefrom under 35 U.S.C. 119, the contents of which in its entirety are herein incorporated by reference.

BACKGROUND

1. Technical Field

Some example embodiments of the present inventive concepts relate to a caster apparatus and/or a transferring apparatus including the same.

2. Description of the Related Art

In a transferring apparatus for transferring a load, the weight of the entire transferring apparatus is changes during loading. Accordingly, a grip force between the ground and a caster apparatus in contact with the ground may change, thereby leading to a change in frictional force at a contact position between the wheel and the ground.

Since the ground on which the transferring apparatus travels is rarely completely flat, when four or more caster apparatuses are used, any of the caster apparatuses may lose contact with the ground, which may cause a situation where the caster apparatus becomes difficult to control.

Therefore, studies have been conducted to improve a grip force between the caster apparatus and the ground.

SUMMARY

Some example embodiments of the present inventive concepts provide a caster apparatus capable of improving a grip force between a wheel and the ground.

Some example embodiments of the present inventive concepts also provide a caster apparatus which can be moved in all directions.

Some example embodiments of the present inventive concepts provide a transferring apparatus capable of improving a grip force between a wheel and the ground.

Some example embodiments of the present inventive concepts also provide a transferring apparatus which can be moved in all directions. In one embodiment, there is provided a caster apparatus including a caster wheel and a first driving wheel disposed on a first side of the caster wheel. The first driving wheel is configured to be driven by a first motor. A second driving wheel is disposed on a second side opposite to the first side of the caster wheel. The second driving wheel is configured to be driven by a second motor different from the first motor. A first buffer, or actuator, is configured to move the first driving wheel in a vertical direction to a ground according to a curvature of the ground. A second buffer, or actuator, is configured to move the second driving wheel in a vertical direction to the ground according to the curvature of the ground, wherein the first and second driving wheels are configured to steer the caster wheel.

According to some example embodiments of the present inventive concepts, there is provided a body; a driving unit; a first caster wheel supporting the body so as not to be driven by the driving unit; a second caster wheel supporting the body so as not to be driven by the driving unit, the second caster wheel being different from the first caster wheel; a first driving wheel disposed on a first side of the first caster wheel, the first driving wheel configured to be driven by the driving unit, and having a diameter smaller than a diameter of the first caster wheel; a second driving wheel disposed on a first side of the second caster wheel, the second driving wheel configured to be driven by the driving unit, and having a diameter smaller than a diameter of the second caster wheel; a first actuator configured to move the first driving wheel in a vertical direction toward a ground according to a curvature of the ground; and a second actuator configured to move the second driving wheel in a vertical direction toward the ground according to a curvature of the ground.

According to some exemplary embodiments of the present inventive concepts, there is provided a caster apparatus comprising a caster wheel; a first driving wheel disposed on a first side of the caster wheel; a second driving wheel disposed on a second side opposite to the first side of the caster wheel; a first actuator configured to bias the first driving wheel in a first direction; and a second actuator configured to bias the second driving wheel in the first direction.

However, some example embodiments of the present inventive concepts are not restricted to those set forth herein. The above and other example embodiments of the present inventive concepts will become more apparent to one of ordinary skill in the art to which the present inventive concepts pertains by referencing the detailed description of the present inventive concepts given below.

BRIEF DESCRIPTION OF THE DRAWINGS

The above and other aspects and features of the present inventive concepts will become more apparent by describing in detail some example embodiments thereof with reference to the attached drawings, in which.

DETAILED DESCRIPTION OF THE EMBODIMENTS

Hereinafter, a transferring apparatus according to an embodiment of the present inventive concepts will be described with reference to FIG. 1.

Figure 1:
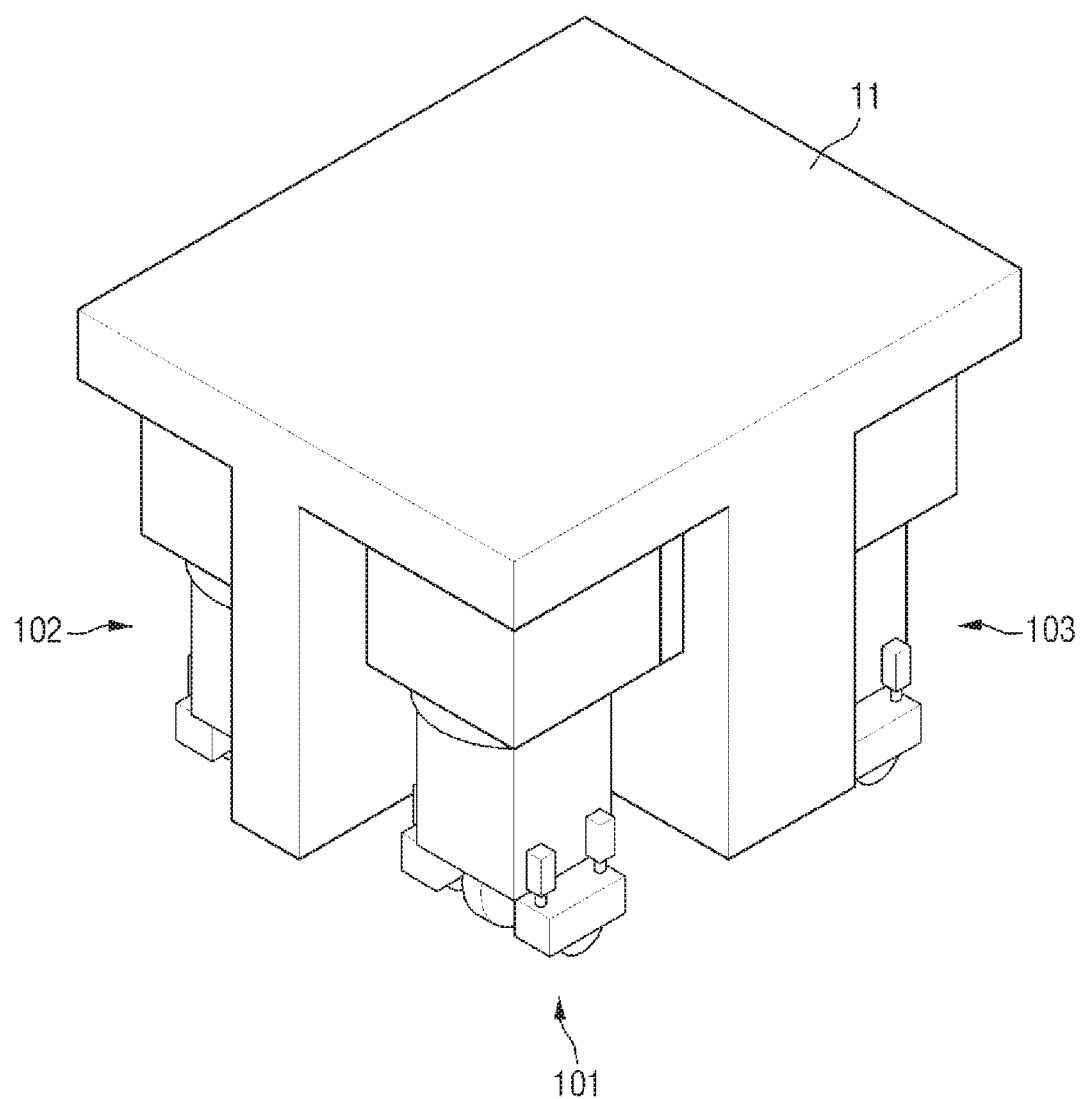
FIG. 1 is a perspective view of a transferring apparatus according to an embodiment of the present inventive concepts.

FIG. 1 is a perspective view of a transferring apparatus according to an embodiment of the present inventive concepts.

Referring to FIG. 1, a transferring apparatus 10 includes a body 11, a first caster apparatus 101, a second caster apparatus 102, a third caster apparatus 103 and a fourth caster apparatus.

The body 11 may have a load loaded thereon. Four caster apparatuses may be disposed below the body 11, but the present inventive concepts are not limited thereto. That is, in some other embodiments, the transferring apparatus 10 may include a different number of caster apparatuses.

The first to fourth caster apparatuses may be disposed below the body 11. Specifically, the first to fourth caster apparatuses may be disposed below the edges of the body 11, respectively, to support the body 11.

The first to fourth caster apparatuses can improve a grip force between each caster apparatus and the ground despite a curvature of the ground by a buffer, or actuator, included in each caster apparatus. The actuator may be a linear actuator. A detailed description thereof will be described later.

The transferring apparatus 10 may be steered by steering the first to fourth caster apparatuses without changing the direction of the body 11. A detailed description thereof will be described later.

Hereinafter, a caster apparatus according to an embodiment of the present inventive concepts will be described with reference to FIG. 2 and FIG. 3. The first to fourth caster apparatuses included in the transferring apparatus 10 of FIG. 1 all have the same structure. Thus, in the following description, the first to fourth caster apparatuses are collectively referred to as a caster apparatus 101.

Figure 2:
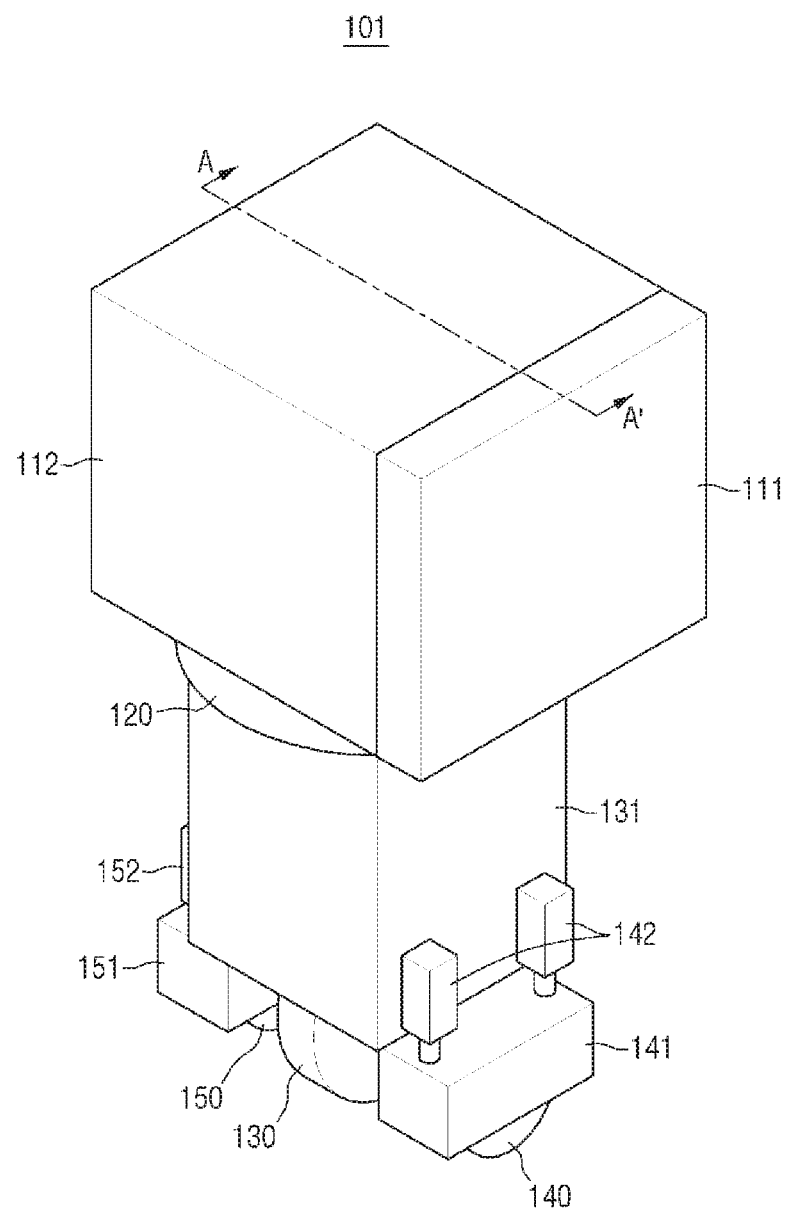
FIG. 2 is a perspective view of a caster apparatus according to an embodiment of the present inventive concepts.

FIG. 2 is a perspective view of a caster apparatus according to an embodiment of the present inventive concepts. FIG. 3 is a cross-sectional view taken along line A-A' of FIG. 2.

Figure 3:
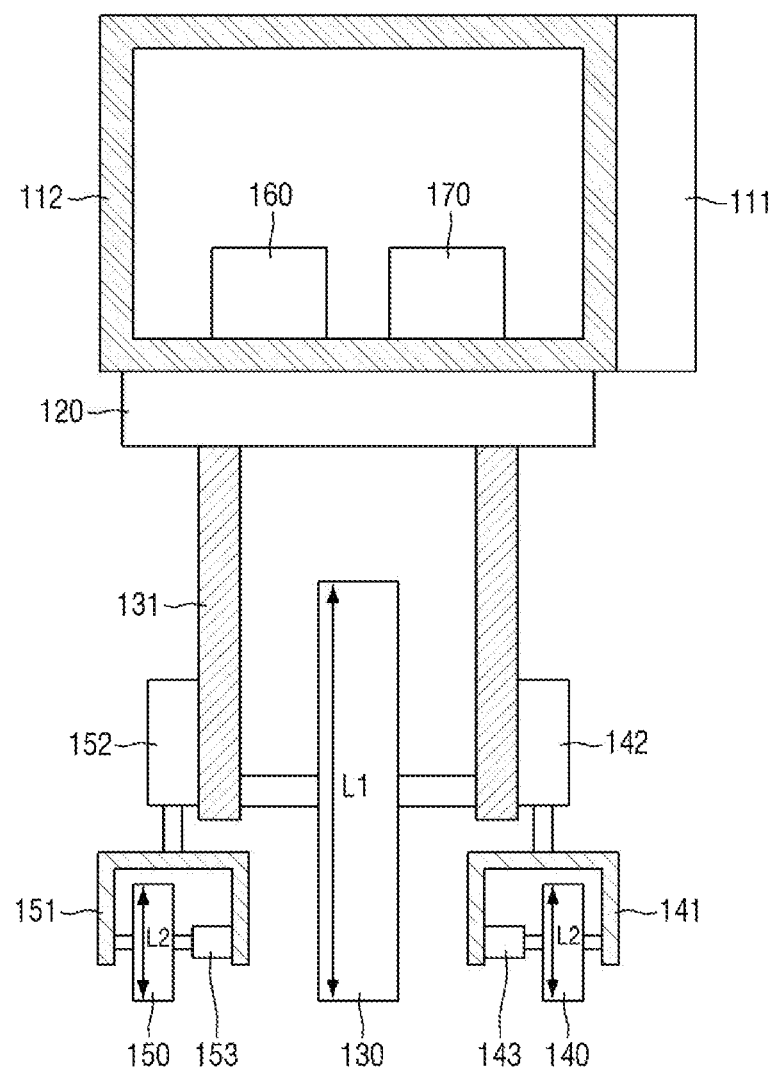
FIG. 3 is a cross-sectional view taken along line A-A' of FIG. 2.

Referring to FIG. 1, FIG. 2 and FIG. 3, the caster apparatus 101 includes a coupling portion 111, a base frame 112, a steering module 120, a caster wheel 130, a caster wheel frame 131, a first driving wheel 140, a first driving wheel frame 141, a first buffer 142, a first motor 143, a second driving wheel 150, a second driving wheel frame 151, a second buffer 152, a second motor 153, a steering angle measurement unit 160 and a controller 170.

The coupling portion 111 may couple the caster apparatus 101 with the transferring apparatus 10. In FIG. 2 and FIG. 3, it has been illustrated that the coupling portion 111 is disposed on the side of the base frame 112, but the present inventive concepts are not limited thereto.

The base frame 112 may be disposed to surround the steering angle measurement unit 160 and the controller 170 disposed therein, thereby protecting the steering angle measurement unit 160 and the controller 170. The base frame 112 may be connected to the coupling portion 111 and the steering module 120.

The steering module 120 may be disposed below the base frame 112. The steering module 120 may be rotated in a direction parallel to the ground if the caster wheel 130 is steered by the driving of the first and second driving wheels 140 and 150. If the steering module 120 is rotated, the base frame 112 may be fixed to the body 11 of the transferring apparatus 10 by the coupling portion 111 without being rotated.

The caster apparatus 101 does not have a driving device which is connected directly to the steering module 120 to steer the steering module 120. Specifically, the steering module 120 may be steered by the driving of the first driving wheel 140 and the second driving wheel 150.

By causing the steering module 120 to be steered by the driving of the first and second driving wheels 140 and 150, it is possible to increase the steering speed of the steering module 120 compared to a case where the steering module 120 is steered by a separate driving device. Accordingly, it is also possible to increase the moving speed of the transferring apparatus 10.

However, the present inventive concepts are not limited thereto. That is, in some other embodiments, the caster apparatus 101 may have a driving device which is connected directly to the steering module 120 to drive the steering module 120.

The caster wheel 130 may be disposed below the steering module 120. The caster wheel 130 can support the base frame 112. Therefore, the caster wheel 130 can support the transferring apparatus 10 connected to the caster apparatus 101.

The caster apparatus 101 does not have a separate driving device which is connected directly to the caster wheel 130 to drive the caster wheel 130. Further, the caster wheel 130 is not driven by the first motor 143 and the second motor 153. However, the present inventive concepts are not limited thereto. That is, in some other embodiments, the caster apparatus 101 may include a separate driving device which is connected directly to the caster wheel 130 to drive the caster wheel 130.

The caster wheel 130 may be driven by the driving of the first and second driving wheels 140 and 150. In FIG. 2 and FIG. 3, it has been illustrated that the caster wheel 130 has a circular wheel shape, but the present inventive concepts are not limited thereto.

The caster wheel frame 131 may be disposed so as to surround a part of the caster wheel 130, thereby protecting the caster wheel 130. However, the present inventive concepts are not limited thereto.

The caster wheel frame 131 may be connected to a rotation axis of the caster wheel 130. Therefore, the caster wheel 130 and the caster wheel frame 131 may support the base frame 112.

The first driving wheel 140 may be disposed on the first side of the caster wheel 130. If the ground is horizontal, a contact surface where the first driving wheel 140 is in contact with the ground may be formed on the same plane as the contact surface where the caster wheel 130 is in contact with the ground.

The first driving wheel 140 may be driven by the first motor 143. In FIG. 2 and FIG. 3, it has been illustrated that the first driving wheel 140 has a circular wheel shape, but the present inventive concepts are not limited thereto.

A diameter L2 of the first driving wheel 140 may be different from a diameter L1 of the caster wheel 130. For some example, the diameter L1 of the caster wheel 130 may be greater than the diameter L2 of the first driving wheel 140.

If the diameter L1 of the caster wheel 130 is relatively large, a repulsive force against an obstacle formed on the ground may relatively reduce a force affecting the caster apparatus 101. Accordingly, it may be easy to overcome an obstacle.

If the diameter L2 of the first driving wheel 140 is relatively small, a force required for driving the first driving wheel 140 can be reduced relatively. Accordingly, it is possible to relatively reduce the capacity of a power supply body (battery) for driving the first driving wheel 140.

The first driving wheel frame 141 may be disposed so as to surround a part of the first driving wheel 140, thereby protecting the first driving wheel 140. However, the present inventive concepts are not limited thereto.

The first driving wheel frame 141 may be connected to a rotation axis of the first driving wheel 140.

The first motor 143 may be surrounded by the first driving wheel frame 141. The first motor 143 may be connected to the first driving wheel 140 to drive the first driving wheel 140.

However, the present inventive concepts are not limited thereto. That is, in some other embodiments, the first motor 143 may be surrounded by the caster wheel frame 131. In this case, the first motor 143 may be connected to the first driving wheel 140 by a driving belt to drive the first driving wheel 140.

The second driving wheel 150 may be disposed on a second side opposite to the first side of the caster wheel 130. If the ground is horizontal, a contact surface where the second driving wheel 150 is in contact with the ground may be formed on the same plane as the contact surface where the caster wheel 130 is in contact with the ground.

The second driving wheel 150 may be driven by the second motor 153. In FIG. 2 and FIG. 3, it has been illustrated that the second driving wheel 150 has a circular wheel shape, but the present inventive concepts are not limited thereto.

A diameter L2 of the second driving wheel 150 may be different from a diameter L1 of the caster wheel 130. For some example, the diameter L1 of the caster wheel 130 may be greater than the diameter L2 of the second driving wheel 150.

The diameter L2 of the second driving wheel 150 may be the same as the diameter L2 of the first driving wheel 140. However, the present inventive concepts are not limited thereto. That is, in some other embodiments, the diameter L2 of the second driving wheel 150 may be different from the diameter L2 of the first driving wheel 140.

If the diameter L1 of the caster wheel 130 is relatively large, a repulsive force against an obstacle formed on the ground may relatively reduce a force affecting the caster apparatus 101. Accordingly, it may be easy to overcome an obstacle.

If the diameter L2 of the second driving wheel 150 is relatively small, a force required for driving the second driving wheel 150 can be reduced relatively. Accordingly, it is possible to relatively reduce the capacity of a power supply body (battery) for driving the second driving wheel 150.

The second driving wheel frame 151 may be disposed so as to surround a part of the second driving wheel 150, thereby protecting the second driving wheel 150. However, the present inventive concepts are not limited thereto.

The second driving wheel frame 151 may be connected to a rotation axis of the second driving wheel 150.

The second motor 153 may be surrounded by the second driving wheel frame 151. The second motor 153 may be connected to the second driving wheel 150 to drive the second driving wheel 150.

However, the present inventive concepts are not limited thereto. That is, in some other embodiments, the second motor 153 may be surrounded by the caster wheel frame 131. In this case, the second motor 153 may be connected to the second driving wheel 150 by a driving belt to drive the second driving wheel 150.

The first buffer 142 may be disposed on the first driving wheel frame 141. One end of the first buffer 142 may be connected to the first driving wheel frame 141, and the side of the first buffer 142 may be connected to the side of the caster wheel frame 131. However, the present inventive concepts are not limited thereto.

The first buffer 142 may include a material that is contracted or relaxed. The material that is contracted or relaxed may be, for some example, at least one of spring, rubber and air. However, the present inventive concepts are not limited thereto.

The first buffer 142 may be contracted or relaxed to move the first driving wheel 140 in a vertical direction to the ground according to a curvature of the ground. Accordingly, the first buffer 142 can improve a grip force between the first driving wheel 140 and the ground.

Further, the first buffer 142 can relatively reduce a change in the frictional force between the first driving wheel 140 and the ground despite a change in the weight of the load by contraction or relaxation.

The second buffer 152 may be disposed on the second driving wheel frame 151. One end of the second buffer 152 may be connected to the second driving wheel frame 151, and the side of the second buffer 152 may be connected to the side of the caster wheel frame 131. However, the present inventive concepts are not limited thereto.

The second buffer 152 may include a material that is contracted or relaxed. The material that is contracted or relaxed may be, for some example, at least one of spring, rubber and air. However, the present inventive concepts are not limited thereto.

The second buffer 152 may be contracted or relaxed to move the second driving wheel 150 in a vertical direction to the ground according to a curvature of the ground. Accordingly, the second buffer 152 can improve a grip force between the second driving wheel 150 and the ground.

Further, the second buffer 152 can relatively reduce a change in the frictional force between the second driving wheel 150 and the ground despite a change in the weight of the load by contraction or relaxation.

The steering angle measurement unit 160 may be disposed in the base frame 112. However, the present inventive concepts are not limited thereto.

The steering angle measurement unit 160 may measure a steering angle of the caster wheel 130. Specifically, if the steering angle of the caster wheel 130 is changed by the driving of the first driving wheel 140 and the second driving wheel 150, the steering angle measurement unit 160 may measure the changed steering angle of the caster wheel 130.

The controller 170 may be disposed in the base frame 112. However, the present inventive concepts are not limited thereto.

The controller 170 may receive the steering angle of the caster wheel 130 measured by the steering angle measurement unit 160. The controller 170 may control the first driving wheel 140 and the second driving wheel 150 in consideration of the received steering angle of the caster wheel 130 and the traveling direction of the transferring apparatus 10. Accordingly, the transferring apparatus 10 can be moved in all directions on the ground.

Hereinafter, a contact state between the caster apparatus and the ground according to some embodiments of the present inventive concepts will be described with reference to FIG. 4.

Figure 4:
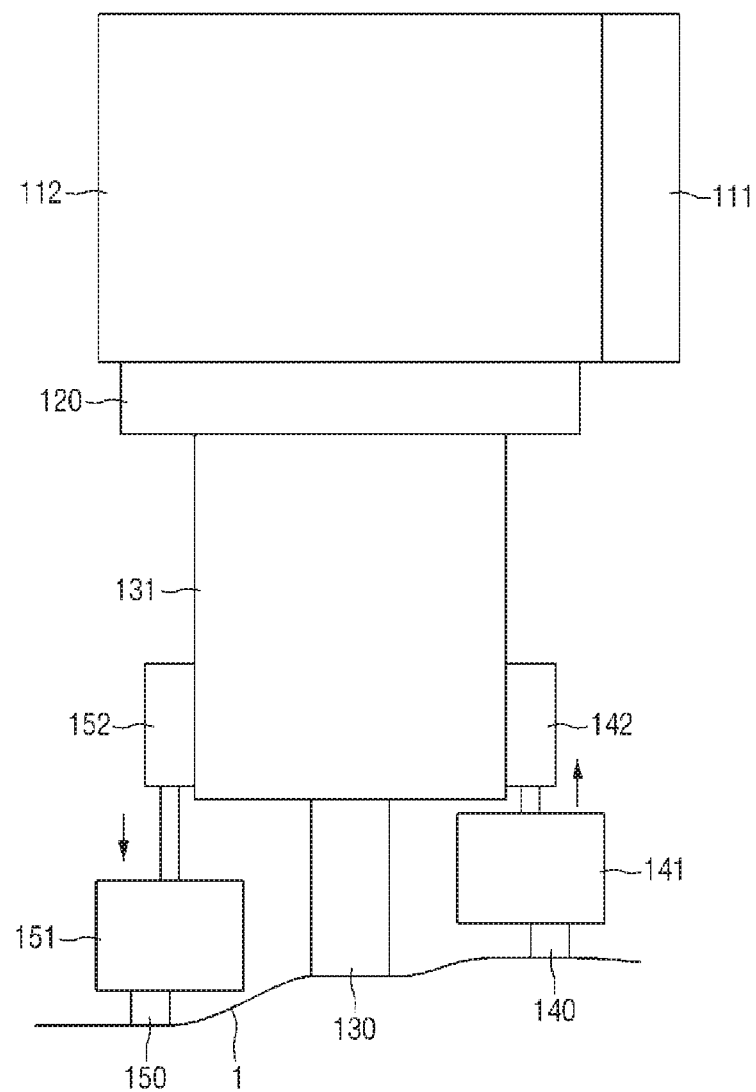
FIG. 4 is a diagram for explaining a contact state between the caster apparatus and the ground according to some embodiments of the present inventive concepts.

FIG. 4 is a diagram for explaining a contact state between the caster apparatus and the ground according to some embodiments of the present inventive concepts.

Referring to FIG. 4, FIG. 4 shows that a height of the ground 1 in contact with the first driving wheel 140 is higher than a height of the ground 1 in contact with the caster wheel 130, and a height of the ground 1 in contact with the second driving wheel 150 is lower than a height of the ground 1 in contact with the caster wheel 130.

In this case, the first driving wheel 140 may be moved up toward the first buffer 142. Accordingly, the first buffer 142 may be contracted. Further, the second driving wheel 150 may be moved down toward the ground 1. Therefore, the second buffer 152 may be relaxed.

By the above-described operation of the first buffer 142 and the second buffer 152, it is possible to increase a grip force between the first driving wheel 140 and the ground 1 and a grip force between the second driving wheel 150 and the ground 1 even if the ground 1 has a curvature.

Hereinafter, a direction changing operation of a caster apparatus according to some embodiments of the present inventive concepts will be described with reference to FIG. 1, FIG. 3, FIG. 5, FIG. 6 and FIG. 7.

Figure 5:
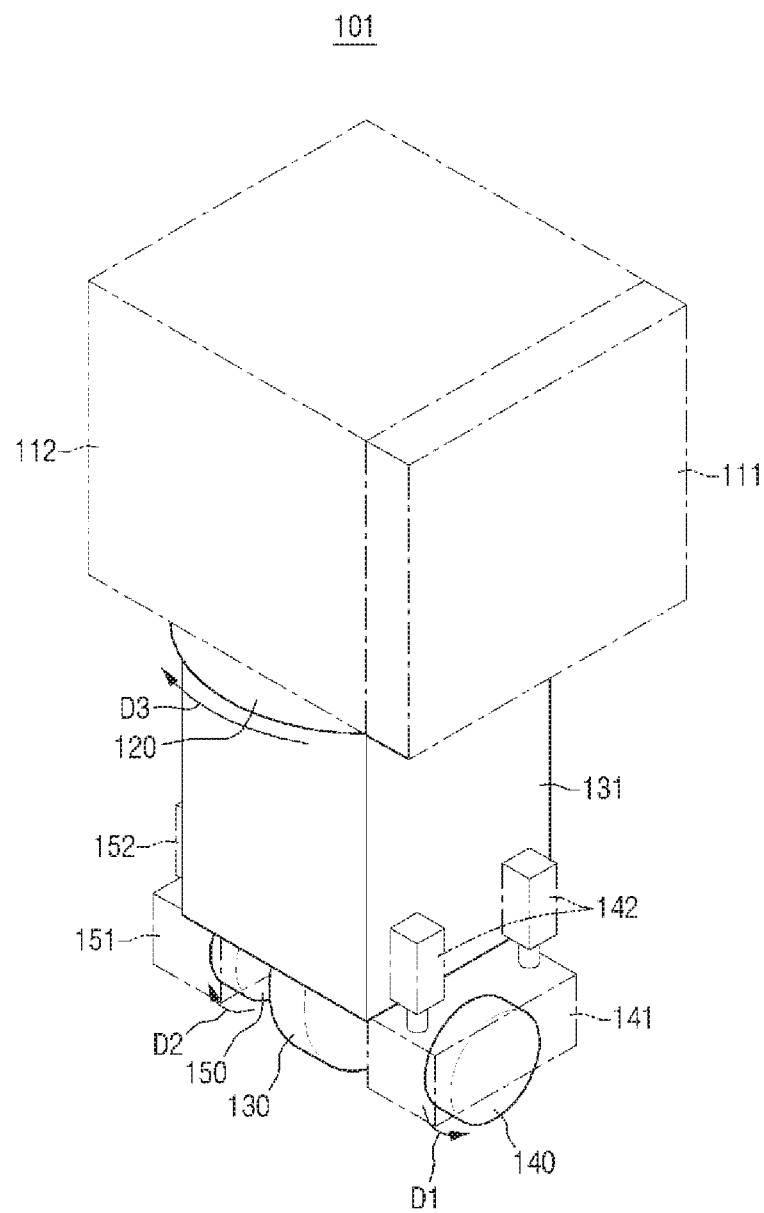
FIG. 5 and FIG. 6 are diagrams for explaining a direction changing operation of a caster apparatus according to some embodiments of the present inventive concepts.
Figure 6:
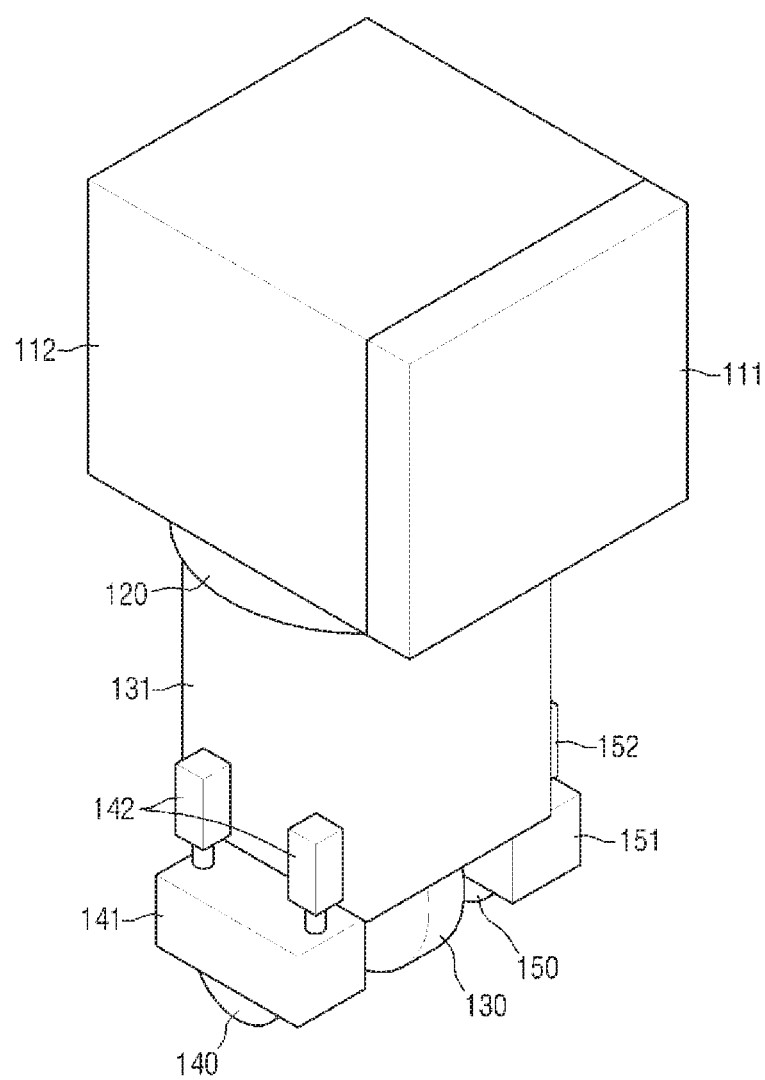
Figure 7:
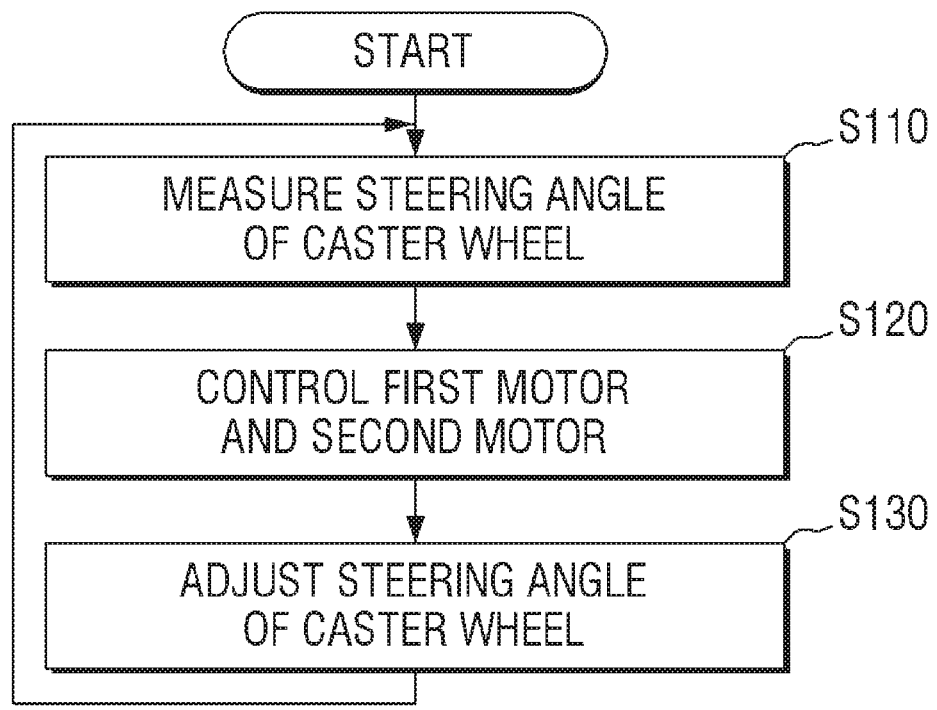
FIG. 7 is a flowchart sequentially illustrating a direction changing operation of a caster apparatus according to some embodiments of the present inventive concepts.

FIG. 5 and FIG. 6 are diagrams for explaining a direction changing operation of a caster apparatus according to some embodiments of the present inventive concepts. FIG. 7 is a flowchart sequentially illustrating a direction changing operation of a caster apparatus according to some embodiments of the present inventive concepts.

Referring to FIG. 1, FIG. 5 and FIG. 6, if the first driving wheel 140 is driven in a first direction D1 and the second driving wheel 150 is driven in a second direction D2, the steering module 120 may be steered in a third direction D3. Thus, the steering module 120 may be steered without a separate driving device connected directly to the steering module 120.

In a case where the steering module 120 is driven by the first driving wheel 140 and the second driving wheel 150, the direction of the base frame 112 and the coupling portion 111 is not changed. Accordingly, the transferring apparatus 10 connected to the caster apparatus 101 can be moved in all directions on the ground without changing the direction of the body 11.

Referring to FIG. 3 and FIG. 7, the steering angle measurement unit 160 may measure the steering angle of the caster wheel 130. Further, when it is necessary to change the steering angle of the caster wheel 130, the steering angle measurement unit 160 may calculate the steering angle of the caster wheel 130 after the change (S110).

The steering angle measurement unit 160 may provide the measured steering angle of the caster wheel 130 or the calculated steering angle of the caster wheel 130 to the controller 170.

The controller 170 may control the first motor 143 and the second motor 153 by using the received steering angle of the caster wheel 130 (S120). Specifically, the controller 170 may control the first motor 143 and the second motor 153 by using the measured current steering angle of the caster wheel 130 and the steering angle of the caster wheel 130 after the steering.

The controller 170 may drive the first driving wheel 140 by controlling the first motor 143. Further, the controller 170 may drive the second driving wheel 150 by controlling the second motor 153.

The controller 170 may adjust the steering angle of the caster wheel 130 by driving the first driving wheel 140 and the second driving wheel 150 (S130). Therefore, the controller 170 may control the caster apparatus 101, thereby controlling the movement of the transferring apparatus 10 coupled to the caster apparatus 101.

The caster apparatus 101 and the transferring apparatus 10 including the caster apparatus 101 according to the present inventive concepts can improve a grip force between the first and second driving wheels 140 and 150 and the ground by using the first and second buffers 142 and 152. Accordingly, it is possible to reduce a slip between the ground and the first and second driving wheels 140 and 150 despite a change in the frictional force between the caster apparatus 101 and the ground due to a change in the weight of the load.

The caster apparatus 101 and the transferring apparatus 10 including the caster apparatus 101 according to the present inventive concepts can improve a grip force between the first and second driving wheels 140 and 150 and the ground by using the first and second buffers 142 and 152 when the ground 1 has a curvature.

Further, the caster apparatus 101 and the transferring apparatus 10 including the caster apparatus 101 according to the present inventive concepts can be moved in all directions on the ground without changing the direction of the transferring apparatus 10 by steering the caster wheel 130 using the first and second driving wheels 140 and 150.

Hereinafter, a caster apparatus according to another embodiment of the present inventive concepts will be described with reference to FIG. 8. The following description will be made focusing on differences from the caster apparatus of FIG. 3.

Figure 8:
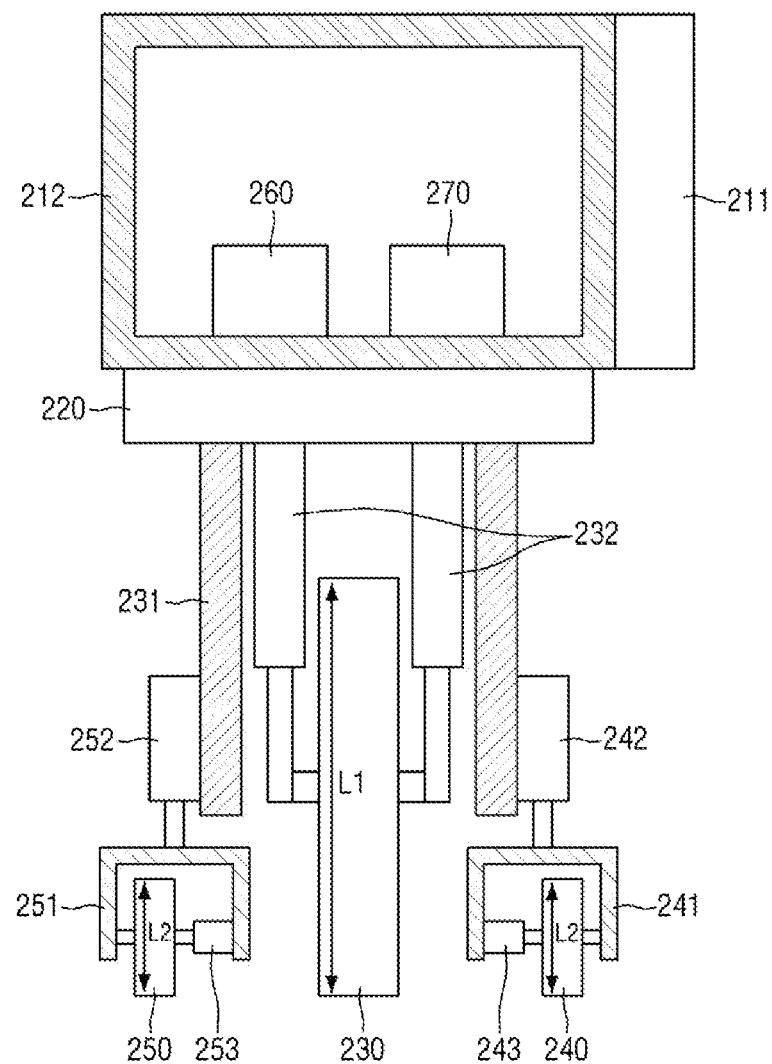
FIG. 8 is a cross-sectional view of a caster apparatus according to another embodiment of the present inventive concepts.

FIG. 8 is a cross-sectional view of a caster apparatus according to another embodiment of the present inventive concepts.

Referring to FIG. 8, a caster apparatus 201 includes a coupling portion 211, a base frame 212, a steering module 220, a caster wheel 230, a caster wheel frame 231, a third buffer 232, a first driving wheel 240, a first driving wheel frame 241, a first buffer 242, a first motor 243, a second driving wheel 250, a second driving wheel frame 251, a second buffer 252, a second motor 253, a steering angle measurement unit 260 and a controller 270.

Unlike the caster apparatus 101 of FIG. 3, the caster apparatus 201 further includes the third buffer 232. The third buffer 232 may be surrounded by the caster wheel frame 231.

The third buffer 232 may be disposed on both sides of the caster wheel 230. One end of the third buffer 232 may be connected to the rotation axis of the caster wheel 230, and the other end of the third buffer 232 may be connected to the steering module 220. However, the present inventive concepts are not limited thereto.

The third buffer 232 may include a material that is contracted or relaxed. The material that is contracted or relaxed may be, for some example, at least one of spring, rubber and air. However, the present inventive concepts are not limited thereto.

The third buffer 232 may be contracted or relaxed to move the caster wheel 230 in a vertical direction to the ground according to a curvature of the ground. Thus, the third buffer 232 can improve a grip force between the caster wheel 230 and the ground.

Compared to the caster apparatus 101 of FIG. 3, the caster apparatus 201 further includes the third buffer 232 to thereby further improve a grip force between the caster wheel 230 and the ground according to a curvature of the ground.

Hereinafter, a caster apparatus according to still another embodiment of the present inventive concepts will be described with reference to FIG. 9. The following description will be made focusing on differences from the caster apparatus of FIG. 3.

Figure 9:
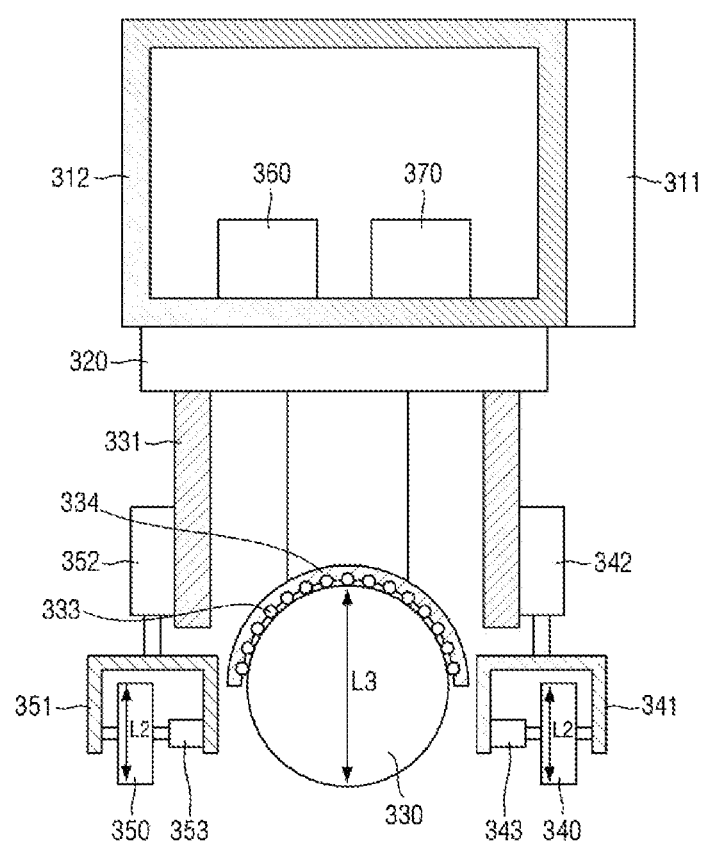
FIG. 9 is a cross-sectional view of a caster apparatus according to still another embodiment of the present inventive concepts.

FIG. 9 is a cross-sectional view of a caster apparatus according to still another embodiment of the present inventive concepts.

Referring to FIG. 9, a caster apparatus 301 includes a coupling portion 311, a base frame 312, a steering module 320, a caster wheel 330, a first caster wheel frame 331, a bearing 333, a second caster wheel frame 334, a first driving wheel 340, a first driving wheel frame 341, a first buffer 342, a first motor 343, a second driving wheel 350, a second driving wheel frame 351, a second buffer 352, a second motor 353, a steering angle measurement unit 360 and a controller 370.

Unlike the caster apparatus 101 of FIG. 3, the caster apparatus 301 may have a spherical shape. Further, the caster wheel 330 may be disposed below the steering module 320 to support the base frame 312.

The caster apparatus 301 does not have a separate driving device which is connected directly to the caster wheel 330 to drive the caster wheel 330. Further, the caster wheel 330 is not driven by the first motor 343 and the second motor 353. However, the present inventive concepts are not limited thereto. That is, in some other embodiments, the caster apparatus 301 may include a separate driving device which is connected directly to the caster wheel 330 to drive the caster wheel 330.

The caster wheel 330 may be driven by the driving of the first and second driving wheels 340 and 350. As shown in FIG. 9, the caster wheel 330 may have a spherical shape to relatively reduce an area where the caster wheel 330 is in contact with the ground.

Therefore, in a case where the caster wheel 330 is steered by the driving of the first and second driving wheels 340 and 350, a frictional force between the caster wheel 330 and the ground is relatively reduced, and it is possible to relatively reduce the power required for steering the caster apparatus 301.

The second caster wheel frame 334 may be disposed so as to surround a part of the caster wheel 330, thereby protecting the caster wheel 330. However, the present inventive concepts are not limited thereto.

A part of the bearing 333 may be inserted into the second caster wheel frame 334. A part of the bearing 333 exposed from the second caster wheel frame 334 may be in contact with the caster wheel 330.

The bearing 333 does not have a separate driving device. When the caster wheel 330 is driven by the driving of the first and second driving wheels 340 and 350, the bearing 333 may assist the driving of the caster wheel 330 by rotating in contact with the caster wheel 330.

A diameter L2 of the first driving wheel 340 may be different from a diameter L3 of the caster wheel 330. For some example, the diameter L3 of the caster wheel 330 may be greater than the diameter L2 of the first driving wheel 340.

A diameter L2 of the second driving wheel 350 may be different from a diameter L3 of the caster wheel 330. For some example, the diameter L3 of the caster wheel 330 may be greater than the diameter L2 of the second driving wheel 350.

Hereinafter, a caster apparatus according to still another embodiment of the present inventive concepts will be described with reference to FIG. 10 and FIG. 11. The following description will be made focusing on differences from the caster apparatus of FIG. 3 and the caster apparatus of FIG. 9.

Figure 10:
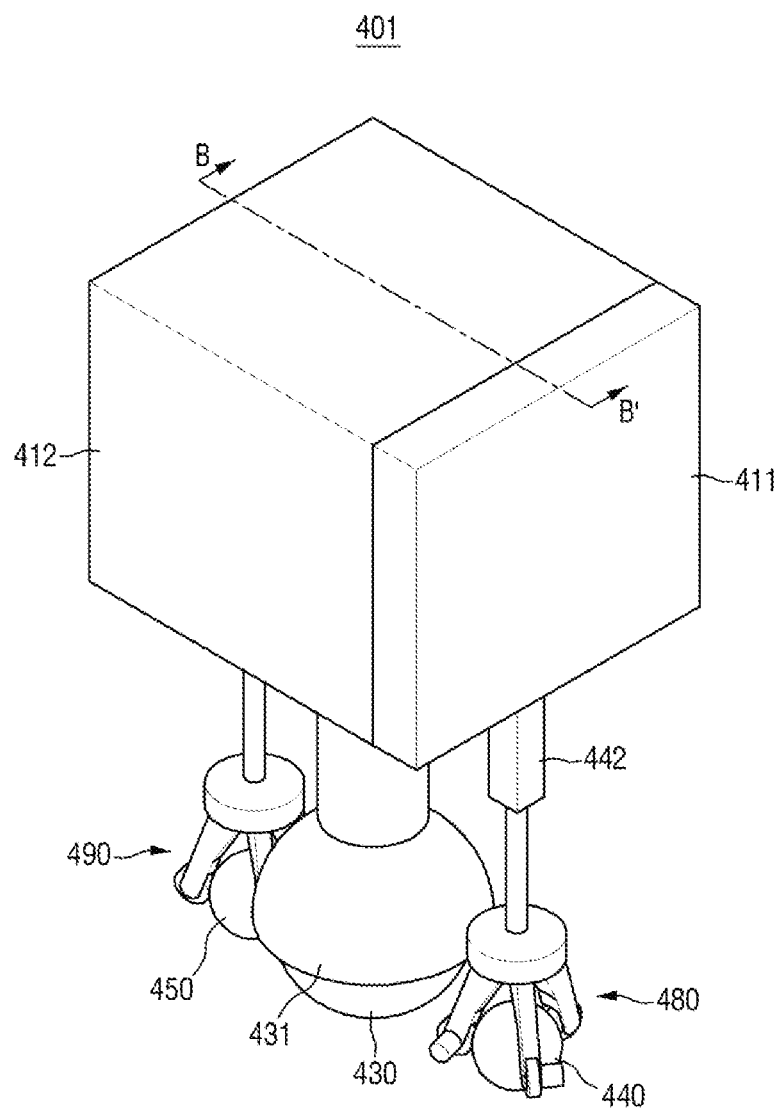
FIG. 10 is a perspective view of a caster apparatus according to still another embodiment of the present inventive concepts.

FIG. 10 is a perspective view of a caster apparatus according to still another embodiment of the present inventive concepts. FIG. 11 is a cross-sectional view taken along line B-B' of FIG. 10.

Figure 11:
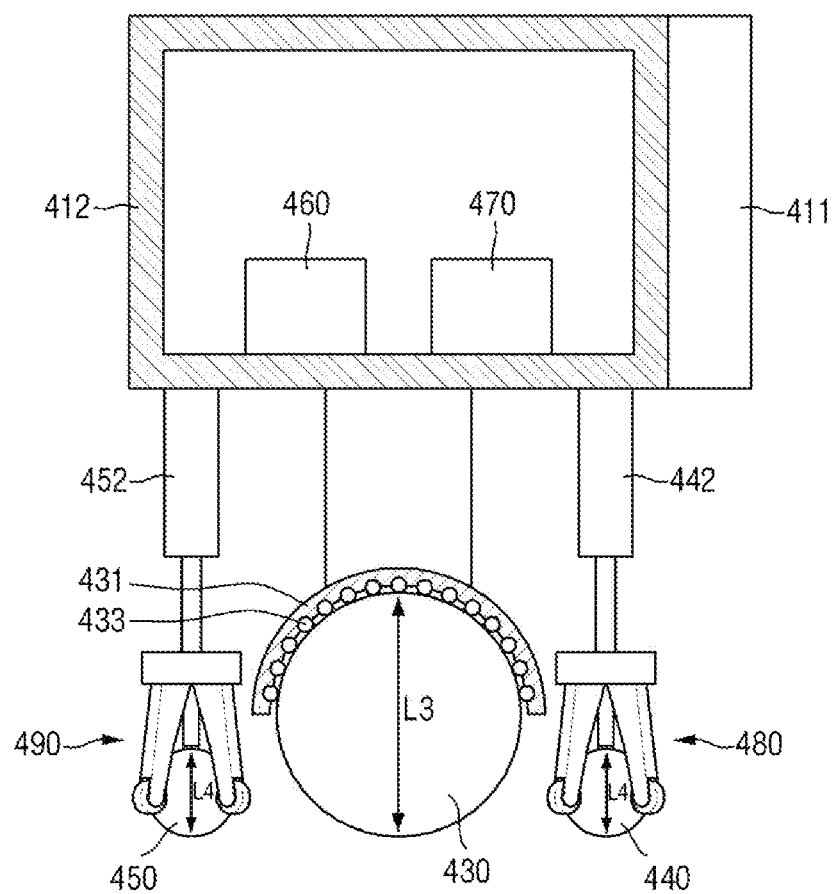
FIG. 11 is a cross-sectional view taken along line B-B' of FIG. 10.

Referring to FIG. 10 and FIG. 11, a caster apparatus 401 includes a coupling portion 411, a base frame 412, a caster wheel 430, a caster wheel frame 431, a bearing 433, a first driving wheel 440, a first buffer 442, a second driving wheel 450, a second buffer 452, a first driving unit 480, a second driving unit 490, a steering angle measurement unit 460 and a controller 470.

The caster apparatus 401 does not include a steering module unlike the caster apparatus 101 of FIG. 3 and the caster apparatus 301 of FIG. 9. The caster apparatus 401 can change the direction of the caster wheel 430 by the driving of the first and second driving wheels 440 and 450 having a spherical shape without the steering by the steering module. A detailed description thereof will be described later.

The caster wheel 430 may be disposed below the base frame 412. The caster wheel 430 may support the base frame 412.

The caster apparatus 401 does not have a separate driving device which is connected directly to the caster wheel 430 to drive the caster wheel 430. Further, the caster wheel 430 is not driven by the first driving unit 480 and the second driving unit 490. However, the present inventive concepts are not limited thereto. That is, in some other embodiments, the caster apparatus 401 may include a separate driving device which is connected directly to the caster wheel 430 to drive the caster wheel 430.

The caster wheel 430 may be driven by the driving of the first and second driving wheels 440 and 450.

The first driving wheel 440 may be disposed on the first side of the caster wheel 430. If the ground is horizontal, a contact surface where the first driving wheel 440 is in contact with the ground may be formed on the same plane as the contact surface where the caster wheel 430 is in contact with the ground.

The first driving wheel 440 may have a spherical shape. The first driving wheel 440 may be driven by the first driving unit 480.

A diameter L4 of the first driving wheel 440 may be different from a diameter L3 of the caster wheel 430. For some example, the diameter L3 of the caster wheel 430 may be greater than the diameter L4 of the first driving wheel 440.

The second driving wheel 450 may be disposed on a second side opposite to the first side of the caster wheel 430. If the ground is horizontal, a contact surface where the second driving wheel 450 is in contact with the ground may be formed on the same plane as the contact surface where the caster wheel 430 is in contact with the ground.

The second driving wheel 450 may have a spherical shape. The second driving wheel 450 may be driven by the second driving unit 490.

A diameter L4 of the second driving wheel 450 may be different from the diameter L3 of the caster wheel 430. For some example, the diameter L3 of the caster wheel 430 may be greater than the diameter L4 of the second driving wheel 450.

The diameter L4 of the second driving wheel 450 may be the same as the diameter L4 of the first driving wheel 440. However, the present inventive concepts are not limited thereto. That is, in some other embodiments, the diameter L4 of the second driving wheel 450 may be different from the diameter L4 of the first driving wheel 440.

One end of the first buffer 442 may be connected to the first driving unit 480, and the other end opposite to one end of the first buffer 442 may be connected to the base frame 412.

One end of the second buffer 452 may be connected to the second driving unit 490, and the other end opposite to one end of the second buffer 452 may be connected to the base frame 412.

Hereinafter, the driving unit of the caster apparatus of FIG. 10 will be described with reference to FIG. 12.

Figure 12:
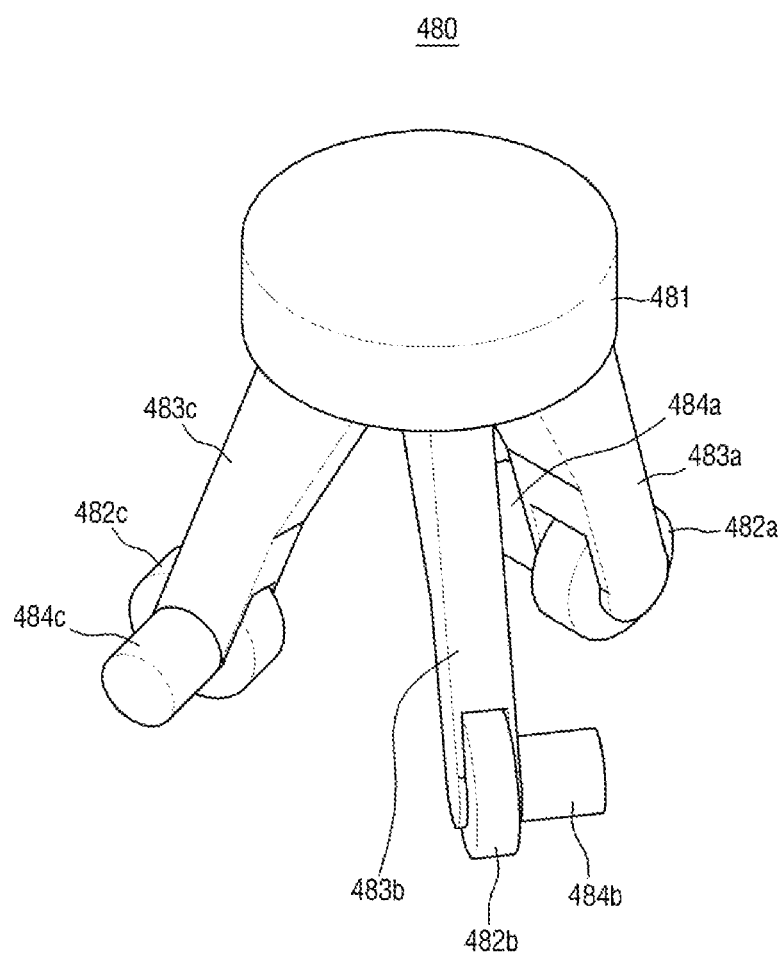
FIG. 12 is a diagram for explaining a driving unit of the caster apparatus of FIG. 10.

FIG. 12 is a diagram for explaining the driving unit of the caster apparatus of FIG. 10.

The second driving unit 490 has the same structure as that of the first driving unit 480. Therefore, a description of the second driving unit 490 is omitted.

Referring to FIG. 12, the first driving unit 480 includes a driving unit frame 481, a first rotation roller 482a, a second rotation roller 482b, a third rotation roller 482c, a first rotation roller connecting portion 483a, a second rotation roller connecting portion 483b, a third rotation roller connecting portion 483c, a first roller motor 484a, a second roller motor 484b, and a third roller motor 484c.

The upper surface of the driving unit frame 481 may be connected to one end of the first buffer 442.

One end of the first rotation roller connecting portion 483a may be connected to the lower surface of the driving unit frame 481. The other end opposite to one end of the first rotation roller connecting portion 483a may be connected to the first rotation roller 482a. Specifically, the other end of the first rotation roller connecting portion 483a may be connected to a rotation axis of the first rotation roller 482a.

The first rotation roller 482a may be in contact with the first driving wheel 440 to rotate the first driving wheel 440.

The first roller motor 484a may be disposed on the side of the first rotation roller 482a. However, the position of the first roller motor 484a is not limited thereto. The first roller motor 484a may transmit the power to the first rotation roller 482a to drive the first rotation roller 482a.

One end of the second rotation roller connecting portion 483b may be connected to the lower surface of the driving unit frame 481. The other end opposite to one end of the second rotation roller connecting portion 483b may be connected to the second rotation roller 482b. Specifically, the other end of the second rotation roller connecting portion 483b may be connected to a rotation axis of the second rotation roller 482b.

The second rotation roller 482b may be in contact with the first driving wheel 440 to rotate the first driving wheel 440.

The second roller motor 484b may be disposed on the side of the second rotation roller 482b. However, the position of the second roller motor 484b is not limited thereto. The second roller motor 484b may transmit the power to the second rotation roller 482b to drive the second rotation roller 482b.

One end of the third rotation roller connecting portion 483c may be connected to the lower surface of the driving unit frame 481. The other end opposite to one end of the third rotation roller connecting portion 483c may be connected to the third rotation roller 482c. Specifically, the other end of the third rotation roller connecting portion 483c may be connected to a rotation axis of the third rotation roller 482c.

The third rotation roller 482c may be in contact with the first driving wheel 440 to rotate the first driving wheel 440.

The third roller motor 484c may be disposed on the side of the third rotation roller 482c. However, the position of the third roller motor 484c is not limited thereto. The third roller motor 484c may transmit the power to the third rotation roller 482c to drive the third rotation roller 482c.

Hereinafter, the driving unit of the caster apparatus of FIG. 10 will be described with reference to FIG. 13 and FIG. 14.

Figure 13:
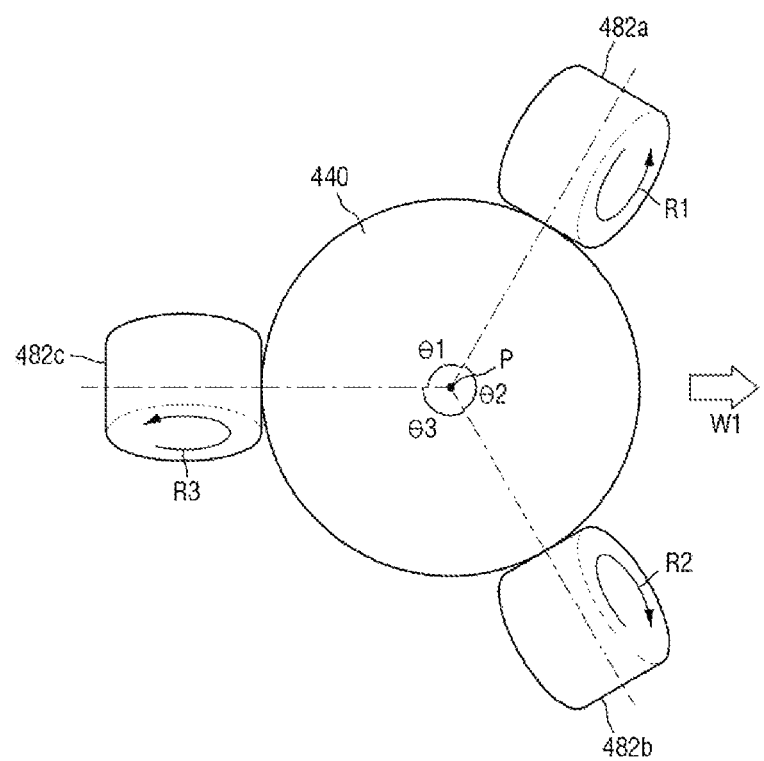
FIG. 13 and FIG. 14 are diagrams for explaining the driving unit of the caster apparatus of FIG. 10.
Figure 14:
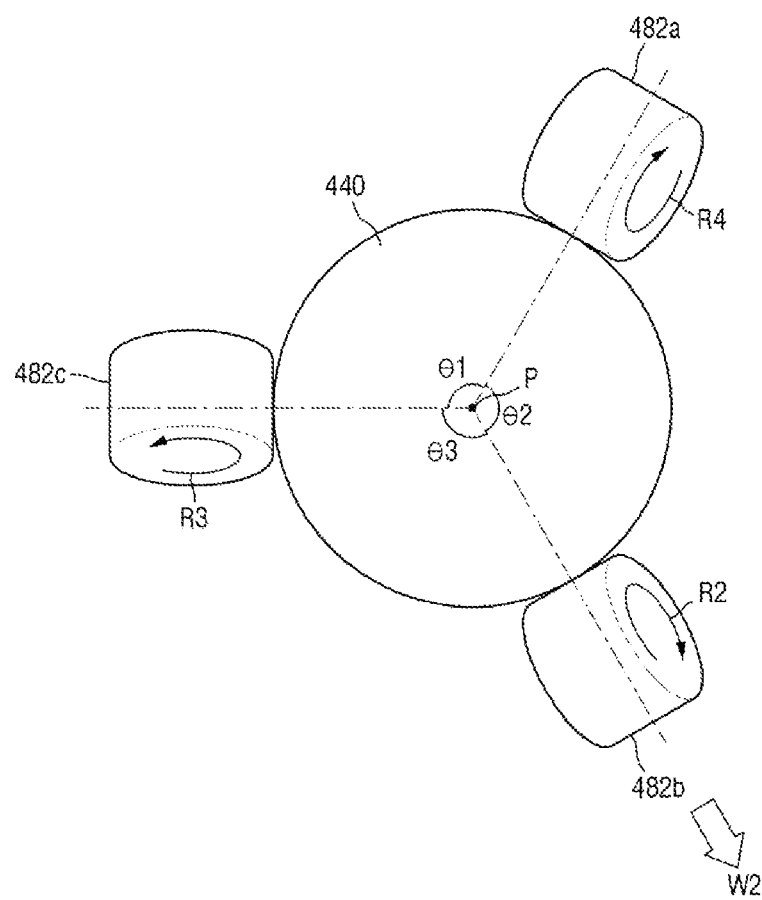

FIG. 13 and FIG. 14 are diagrams for explaining the driving unit of the caster apparatus of FIG. 10.

Referring to FIG. 13 and FIG. 14, the first rotation roller 482a, the second rotation roller 482b and the third rotation roller 482c may be spaced apart from each other on the surface of the first driving wheel 440 with respect to a central axis P of the first driving wheel 440.

An angle between a line connecting between the central axis P of the first rotation roller 482a and the central axis P of the first driving wheel 440 and a line connecting between the central axis P of the third rotation roller 482c and the central axis P of the first driving wheel 440 is a first angle $\theta1$.

An angle between a line connecting between the central axis P of the first rotation roller 482a and the central axis P of the first driving wheel 440 and a line connecting between the central axis P of the second rotation roller 482b and the central axis P of the first driving wheel 440 is a second angle $\theta2$.

An angle between a line connecting between the central axis P of the second rotation roller 482b and the central axis P of the first driving wheel 440 and a line connecting between the central axis P of the third rotation roller 482c and the central axis P of the first driving wheel 440 is a third angle $\theta3$.

The first to third angles $\theta1$, $\theta2$ and $\theta3$ may be equal to each other. However, the present inventive concepts are not limited thereto. That is, in some other embodiments, the first to third angles $\theta1$, $\theta2$ and $\theta3$ may be different from each other.

Referring to FIG. 13, for some example, if the first rotation roller 482a is rotated in a first direction R1, the second rotation roller 482b is rotated in a second direction R2, and the third rotation roller 482c is rotated in a third direction R3, the first driving wheel 440 may be moved in a first traveling direction W1.

Referring to FIG. 14, for some example, if the first rotation roller 482a is rotated in a fourth direction R4 which is a reverse direction to the first direction R1, the second rotation roller 482b is rotated in the second direction R2, and the third rotation roller 482c is rotated in the third direction R3, the first driving wheel 440 may be moved in a second traveling direction W2.

As described above, the first driving wheel 440 can be moved in all directions on the ground by rotating the first rotation roller 482a, the second rotation roller 482b and the third rotation roller 482c. Therefore, the caster apparatus 401 can be moved in all directions on the ground without the steering of the caster wheel 430 by the steering module.

As compared with the caster apparatus 101 of FIG. 3 and the caster apparatus 301 of FIG. 9, the caster apparatus 401 can change the direction of the caster wheel 430 without the steering module because the first and second driving wheels 440 and 450 have a spherical shape. Therefore, the caster apparatus 401 can change the direction of the caster wheel 430 relatively quickly.

While the present inventive concepts have been particularly shown and described with reference to some example embodiments thereof, it will be understood by those of ordinary skill in the art that various changes in form and details may be made therein without departing from the spirit and scope of the present inventive concepts as defined by the following claims. It is therefore desired that the present embodiments be considered in all respects as illustrative and not restrictive, reference being made to the appended claims rather than the foregoing description to indicate the scope of the inventive concepts.

What is claimed is:

1. A caster apparatus comprising:
   a caster wheel;
   a first driving wheel on a first side of the caster wheel and adjacent to the caster wheel, the first driving wheel configured to be driven by a first motor;
   a second driving wheel on a second side opposite to the first side of the caster wheel and adjacent to the caster wheel, the second driving wheel configured to be driven by a second motor different from the first motor;
   a first buffer configured to move the first driving wheel in a vertical direction to a ground according to a curvature of the ground; and
   a second buffer configured to move the second driving wheel in a vertical direction to the ground according to a curvature of the ground,
   wherein the first and second driving wheels are configured to steer the caster wheel, and
   wherein a diameter of the first driving wheel and a diameter of the second driving wheel are smaller than a diameter of the caster wheel.

2. The caster apparatus of claim 1, further comprising:
   a third buffer configured to move the caster wheel in a vertical direction towards the ground according to a curvature of the ground.

3. The caster apparatus of claim 1, further comprising:
   a steering angle measurement unit configured to measure a steering angle of the caster wheel.

4. The caster apparatus of claim 3, further comprising a controller configured to receive the steering angle of the caster wheel from the steering angle measurement unit and control the first and second motors to adjust the steering angle of the caster wheel.

5. The caster apparatus of claim 1, wherein the caster wheel is configured to not be driven by the first and second motors.

6. The caster apparatus of claim 1, further comprising:
   a caster wheel frame on top of the caster wheel; and
   a plurality of bearings in contact with the caster wheel frame and in contact with the caster wheel.

7. The caster apparatus of claim 1, wherein each of the first driving wheel, the second driving wheel, and the caster wheel have a spherical shape.

8. The caster apparatus of claim 7, further comprising:
   three first rotation rollers spaced apart from each other by a same angle on the first driving wheel, each of the first rotation rollers in contact with the first driving wheel and configured to rotate the first driving wheel; and
   wherein
   the first driving wheel is configured to move in a first direction in response to two of the three first rotation rollers moving in a clockwise direction and one of the three first rotation rollers moving in a counterclockwise direction; and
   the first driving wheel is configured to move in a second direction in response to two of the three first rotation rollers moving in a counterclockwise direction and one of the three first rotation rollers moving in a clockwise direction, the second direction thirty degrees from the first direction.

9. A transferring apparatus comprising:
   a body;
   a driving unit;
   a first caster wheel supporting the body so as not to be driven by the driving unit;
   a second caster wheel supporting the body so as not to be driven by the driving unit, the second caster wheel being different from the first caster wheel;
   a first driving wheel on a first side of the first caster wheel, the first driving wheel configured to be driven by the driving unit, and having a diameter smaller than a diameter of the first caster wheel, the first driving wheel having a spherical shape;
   a second driving wheel on a first side of the second caster wheel, the second driving wheel configured to be driven by the driving unit, and having a diameter smaller than a diameter of the second caster wheel, the second driving wheel having a spherical shape;
   a first buffer configured to move the first driving wheel in a vertical direction toward a ground according to a curvature of the ground; and
   a second buffer configured to move the second driving wheel in a vertical direction toward the ground according to a curvature of the ground.

10. The transferring apparatus of claim 9, further comprising:
    a third driving wheel disposed on a second side opposite to the first side of the first caster wheel configured to be driven by the driving unit, the third driving wheel having a diameter smaller than the diameter of the first caster wheel; and
    a fourth driving wheel disposed on a second side opposite to the first side of the second caster wheel configured to be driven by the driving unit, the fourth driving wheel having a diameter smaller than the diameter of the second caster wheel.

11. The transferring apparatus of claim 10, wherein the first caster wheel is configured to be steered in a third direction when the first driving wheel is configured to rotate in a first direction and the third driving wheel is configured to rotate in a second direction opposite to the first direction, and
    wherein the second caster wheel is configured to be steered in the third direction when the second driving wheel is rotated in the first direction and the fourth driving wheel is rotated in the second direction.

12. The transferring apparatus of claim 9, wherein the first caster wheel and the second caster wheel have a spherical shape.

13. The transferring apparatus of claim 9, wherein the driving unit further includes a first rotation roller in contact with the first driving wheel configured to rotate the first driving wheel, and a second rotation roller in contact with the second driving wheel configured to rotate the second driving wheel.

14. The transferring apparatus of claim 13, wherein a plurality of the first rotation rollers are spaced apart from each other by the same angle on the first driving wheel, and wherein a plurality of the second rotation rollers are spaced apart from each other by the same angle on the second driving wheel.

15. The transferring apparatus of claim 14, wherein
a number of the plurality of the first rotation rollers is three;
the first driving wheel is configured to move in a first direction in response to two of the three first rotation rollers moving in a clockwise direction and one of the three first rotation rollers moving in a counterclockwise direction; and
the first driving wheel is configured to move in a second direction in response to two of the three first rotation rollers moving in a counterclockwise direction and one of the three first rotation rollers moving in a clockwise direction, the second direction thirty degrees from the first direction.

16. A caster apparatus comprising:
a caster wheel;
a first driving wheel on a first side of the caster wheel, the first driving wheel adjacent to the caster wheel;
a second driving wheel on a second side opposite to the first side of the caster wheel, the second driving wheel adjacent to the caster wheel;
a first actuator configured to bias the first driving wheel in a first direction; and
a second actuator configured to bias the second driving wheel in the first direction,
wherein a diameter of the first driving wheel and a diameter of the second driving wheel are smaller than a diameter of the caster wheel.

17. The caster apparatus of claim 16, wherein the first actuator and the second actuator each include at least one of a spring, rubber, or air.

18. The caster apparatus of claim 16, wherein the first actuator includes a first linear actuator, and the second actuator includes a second linear actuator.

19. The caster apparatus of claim 16, further comprising:
a first motor configured to drive the first driving wheel; and
a second motor configured to drive the second driving wheel.

* * * * *